United States Patent [19]

Ermacora et al.

[11] Patent Number: 4,811,553
[45] Date of Patent: Mar. 14, 1989

[54] ROTARY MOWER IN WHICH THE ROTARY CUTTING ELEMENTS ARE DRIVEN BY TRANSMISSION MEANS LOCATED UNDER THE ROTARY CUTTING ELEMENTS

[75] Inventors: Rino Ermacora; Horst Neuerburg, both of Saverne, France

[73] Assignee: Kuhn, S.A., Saverne, France

[21] Appl. No.: 152,041

[22] Filed: Feb. 3, 1988

Related U.S. Application Data

[63] Continuation of Ser. No. 19,672, Feb. 27, 1987, Pat. No. 4,763,463.

[30] Foreign Application Priority Data

Feb. 27, 1985 [FR] France ............................. 86 02899

[51] Int. Cl.$^4$ ............................................ A01D 34/66
[52] U.S. Cl. ............................................ 56/13.6; 56/6
[58] Field of Search ........................... 56/13.6, 6, 192

[56] References Cited

U.S. PATENT DOCUMENTS

| 1,536,514 | 2/1923 | Mehls | 56/295 |
| 3,708,966 | 1/1973 | Reber | 56/13.6 |
| 3,974,630 | 8/1976 | Van der Lely | 56/295 |
| 4,227,365 | 10/1980 | Van der Lely et al. | 56/13.6 |
| 4,476,666 | 10/1984 | Van der Lely et al. | 56/13.6 |
| 4,720,964 | 1/1988 | Ermacora et al. | 56/13.6 |

FOREIGN PATENT DOCUMENTS

| 70585 | 1/1983 | European Pat. Off. | 56/13.6 |
| 2294625 | 12/1974 | France | 56/13.6 |
| 2351580 | 5/1976 | France | 56/13.6 |
| 1570649 | 7/1980 | United Kingdom | 56/13.6 |
| 2059236 | 4/1981 | United Kingdom | 56/13.6 |

*Primary Examiner*—John Weiss
*Attorney, Agent, or Firm*—Oblon, Fisher, Spivak, McClelland & Maier

[57] ABSTRACT

The rotary mower of the invention includes a housing (9) formed by modules (10) which have flanges (29, 30) making it possible to connect them to one another by means of assembly elements (28). The flanges (29, 30) are formed by at least two wings spaced from one another and directed forwardly. The flanges (29, 30) are formed by at least two wings spaced from one another and directed forwardly. The wings are connected by at least one connecting wing directed crosswise to the direction of advance (6) and connected to the body of module (10).

25 Claims, 6 Drawing Sheets

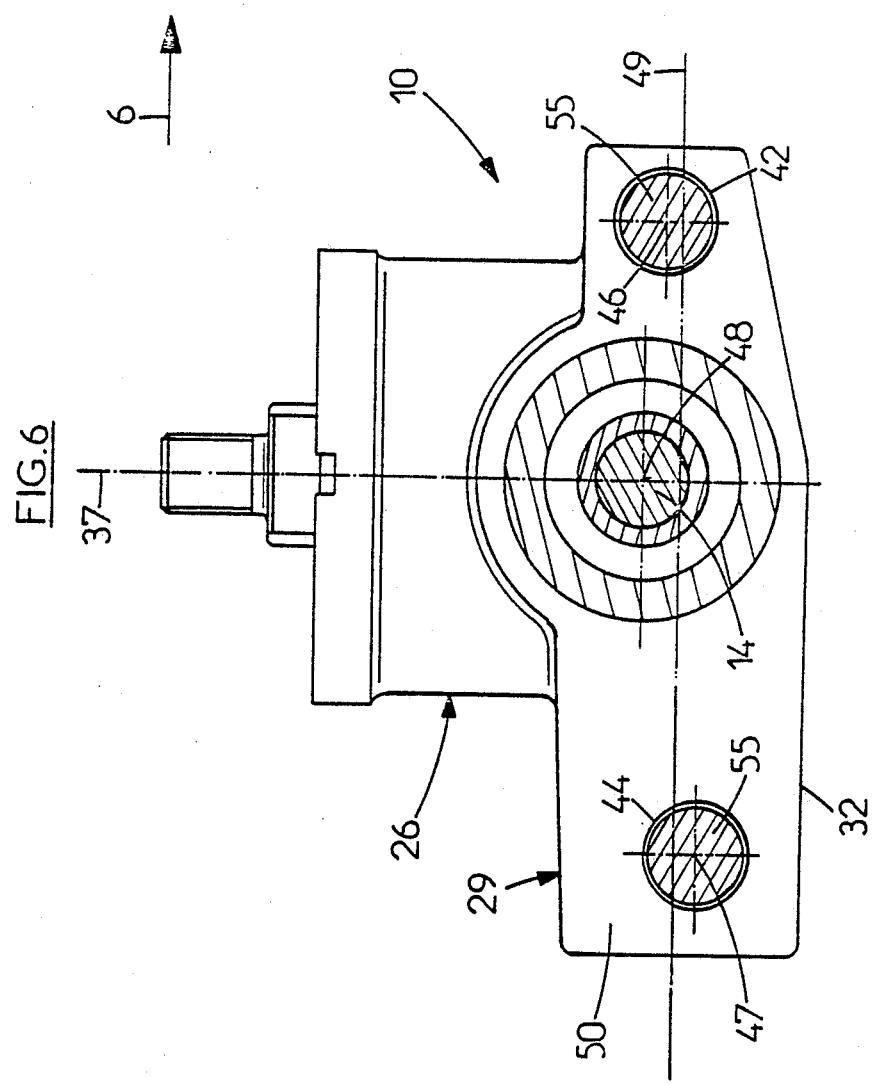

ROTARY MOWER IN WHICH THE ROTARY CUTTING ELEMENTS ARE DRIVEN BY TRANSMISSION MEANS LOCATED UNDER THE ROTARY CUTTING ELEMENTS

This is a continuation, of application Ser. No. 07/019,672, now U.S. Pat. No. 4,763,463, filed Feb. 27, 1987.

FIELD OF THE INVENTION

This invention relates to a mower comprising rotary cutting elements provided with at least one cutting tool, at least one of the rotary cutting elements being driven by transmission means housed in a housing located under the rotary cutting elements.

BACKGROUND OF THE INVENTION

In FR-A-No. 2,566,992 such a mower is disclosed the housing of which comprises modules in which the rotary cutting elements are guided in rotation. The modules comprise flanges which make it possible to connect them to one another by means of assembly elements going through the flanges.

This known mower has the advantage of having a housing of a very interesting construction. The modular character of the construction of the housing makes it possible to manufacture mowers of different working widths, while reducing to a minimum or even eliminating parts specific to each working width. The production of such mowers therefore is very easy, and it is possible to market a range of mowers at a very advantageous cost.

OBJECT OF THE INVENTION

The principal objects of this invention are to improve the shape and strength of the flanges of the modules constituting the housing of the known mower and to simplify the making of these modules.

SUMMARY OF THE INVENTION

For this purpose, according to a first main characteristic of the invention, the mower comprises modules the flanges of which are at least partially formed by at least two wings spaced from one another and directed crosswise to the longitudinal axis of the housing. The wings are connected together by at least one connecting wing directed crosswise to the working direction and connected to the body of the module.

Thanks to this structure, it has been possible to give the assembly elements a sufficient length for them to be able to withstand completely the stresses to which they are subjected, and to give the contact face between two neighboring modules a sufficient surface for the latter not to run the risk of being subject to peening while obtaining during casting a sound structure in the material of the flanges and in the material of the body of the module in the vicinity of the flanges.

The structure according to the invention has also made it possible to impart to the flanges a great breaking strength, to the extent that the forces which are absorbed by the housing during working or transporting are transmitted more effectively by the flanges in the body of the module.

According to a second main characteristic of the invention, each module is formed by a case in which a rotary cutting element is guided in rotation and by a brace which is formed, on at least part of its length, by a tubular section to the back part of which are connected two stiffening wings directed crosswise to the working direction and connected by at least one rib. The construction of the modules is remarkable due to the fact that the rib or ribs are directed crosswise to the longitudinal axis of the housing. Thanks to this characteristic, the module is much simpler to make and is endowed with a very great stiffness which enables it to absorb well the stresses to which it is subjected during the working and transporting of the mower.

Other characteristics of the invention will become apparent from the following description of a nonlimiting embodiment of the invention shown in the accompanying drawings.

BRIEF DESCRIPTION OF THE DRAWINGS

FIG. 6 is a view in section along plane VI in FIG. 2 of the cutting bar of FIG. 1.

DETAILED DESCRIPTION OF THE PRESENTLY PREFERRED EMBODIMENT

Figure 1:
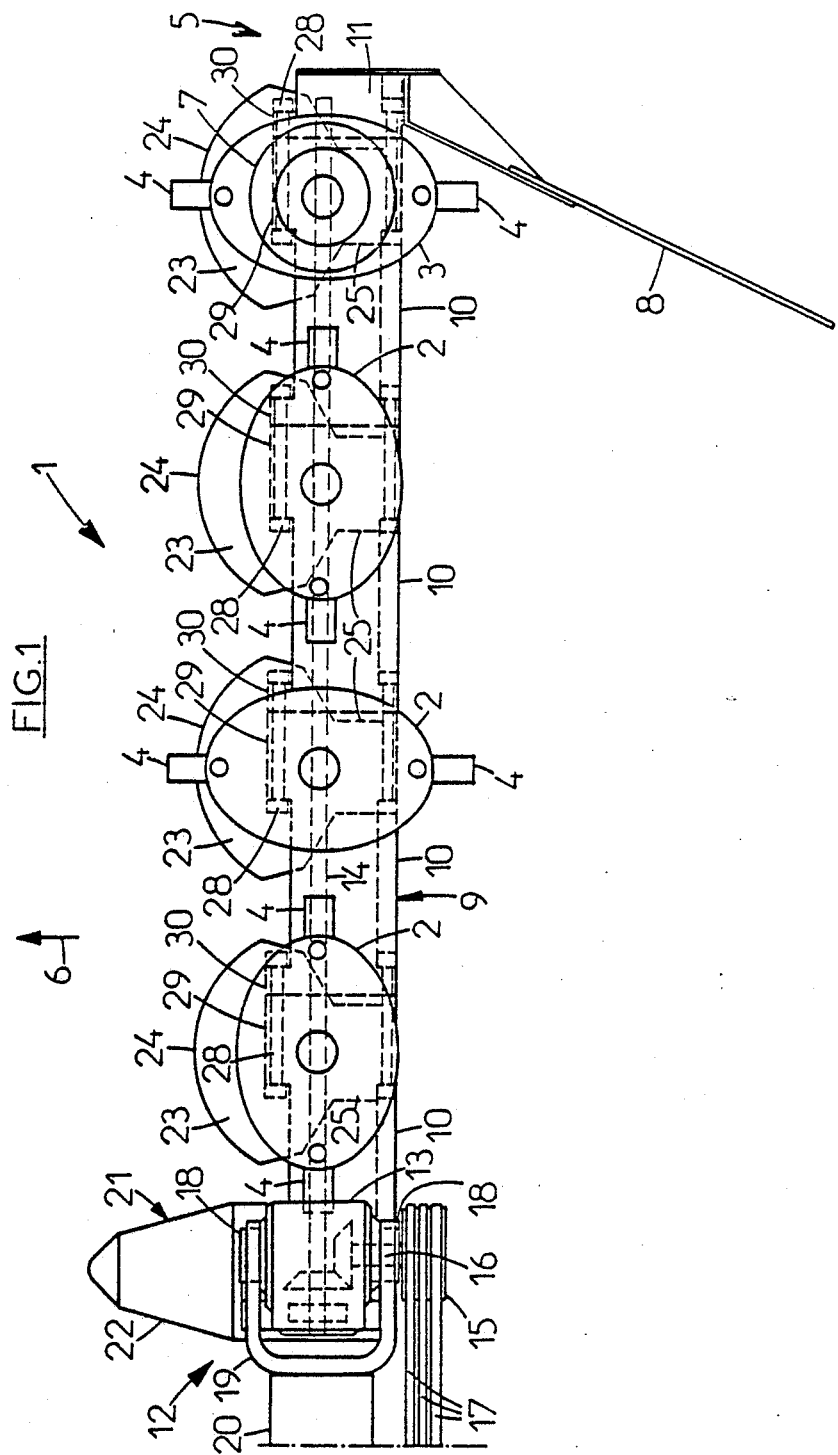
FIG. 1 is a top view of the cutting bar of the mower according to the invention.

FIG. 1 shows a mower or, more precisely, a cutting bar 1 of a mower. The cutting bar 1 comprises three inboard cutting elements 2 and an outboard cutting element 3. Each cutting element 2, 3 rotates around an axis 37 (see FIG. 2) directed upwardly. Each cutting element 2, 3 is provided with two cutting tools 4 which are mounted diametrically opposite each other on the outside edge of the cutting element 2, 3. Preferably, mounting of the cutting tools 4 on the cutting elements 2, 3 is performed so that the cutting tools 4 extend outwardly under the effect of centrifugal force and swing backwardly when they encounter an obstacle during their rotation. The outboard cutting element 3 (i.e., the cutting element located at the right end 5 of the cutting bar 1, seen in the working direction 6 indicated by an arrow in FIGS. 1, 2, and 4–6) is crowned by a cap 7. The cap 7 works with a device for reduction of the cut crop windrow, such as a swath board 8, for example, so that the cut crop windrow is separated from the crop that is still standing.

The cutting elements 2, 3 are guided in rotation in a housing 9 located under the cutting elements 2, 3. The housing 9 is formed from a succession of modules 10. At the right end 5 of the cutting bar 1, the housing 9 is provided with an end module 11 which extends approximately to the outside path described by the outboard cutting element 3, or slightly beyond that path. At the left end 12, the housing 9 is provided with a transmission housing 13. In the housing 9 are housed transmission means 14 such as, for example, a drive shaft which works with gears (not shown) to drive the cutting elements 2, 3 in rotation. Driving of the transmission means 14 in rotation is achieved by a driving mechanism housed in the transmission housing 13 in a fashion known in the art. This driving mechanism receives the movement of a pulley 15 keyed on an input shaft 16.

The pulley 15 is driven in rotation by means of another pulley (not shown) and by belts 17. The other pulley is driven, in a way known in the art, by a cardan shaft (not shown) itself driven by the power take-off of a tractor (not shown) to which the mower is hitched.

The transmission housing 13 comprises two cylindrical bearing surfaces 18 at least approximately concentric with the input shaft 16 of the transmission housing 13. The cylindrical bearing surfaces 18 support a clevis 19 fastened to a frame 20 by means of which the mower is hitched to the tractor. With this arrangement, the cutting bar 1 can follow the ups and downs of the ground by swinging around the cylindrical bearing surfaces 18 without the various driving elements being subjected to additional stresses. Moreover, it is possible to swing the cutting bar 1 to an at least approximately vertical position to reduce the width of the mower during transport on the road.

At the left end 12 of the housing 9 and under it (or, more precisely, under the transmission housing 13) is placed a shoe 21 which has a front part 22 raised like the font of a ski. The shoe 21 enables the mower to slide on the ground during working and to avoid hooking of the cut crop on the transmission housing 13.

At the front, under each cutting element 2, 3, the housing 9 is provided with protective skids 23. The protective skids 23 comprise a front part 24 exhibiting from the top view an approximately circular shape the radius of which is greater than the radius of the end path of the cutting elements 2, 3 but smaller than the radius of the end path of the cutting tools 4. Moreover, the protective skids 23 comprise a back part 25 in the shape of a skid on which the cutting bar 1 also rests during working.

FIGS. 2 to 6 show more precisely the arrangement of the connection between the modules 10 forming the housing 9 of the cutting bar 1.

Each module 10 is made up of a case 26 in which the corresponding cutting element 2, 3 is guided in rotation and of a brace 27 which extends between that case 26 and the case 26 of an adjacent module 10.

The various modules 10 are connected to one another by means of assembly elements 28. To do this, each module 10 comprises a flange 29, 30 at each of its ends. The flanges 29, 30 of two adjacent modules 10 are connected together by the assembly elements 28.

According to the invention, the flanges 29, 30 have a very particular structure. As can be seen in the various figures, the flanges 29 comprise two wings 31, 32, and the flanges 30 comprise two wings 33, 34. The wings 31, 32, 33, 34 of flanges 29, 30 extend toward the front and back of the modules 10 crosswise to the longitudinal axis of the housing, preferably substantially parallel to the working direction 6 and extend at least approximately vertically.

In addition, the wings 31, 32, 33, 34 are located at a certain distance from one another.

The flange 29, located on the side of the case 26 of a module 10, has its wing 31 located on the side of a vertical plane 36 directed in the working direction 6 and going through the axis of rotation 37 of the cutting element 2, 3 guided in that case 26, while the other wing 32 of the flange 29 is located on the other side of the vertical plane 36. In this way, the stresses are transmitted well into the module 10 at the level of the case 26 without deforming the case 26.

The wings 33, 34 of the flange 30 located at the end of the brace 27 away from case 26 also extend a certain distance from one another. The distance that separates the two wings 33, 34 of the flange 30 is smaller than the distance that separates the two wings 31, 32 of the flange 29. This makes it possible easily to house the front part of the flanges 29, 30, as well as the assembly elements 28 located at the front, approximately on the inside of the protective skids 23. Thus, plant debris can be prevented from hooking on the flanges 29, 30 and on the assembly elements 28.

Figure 2:
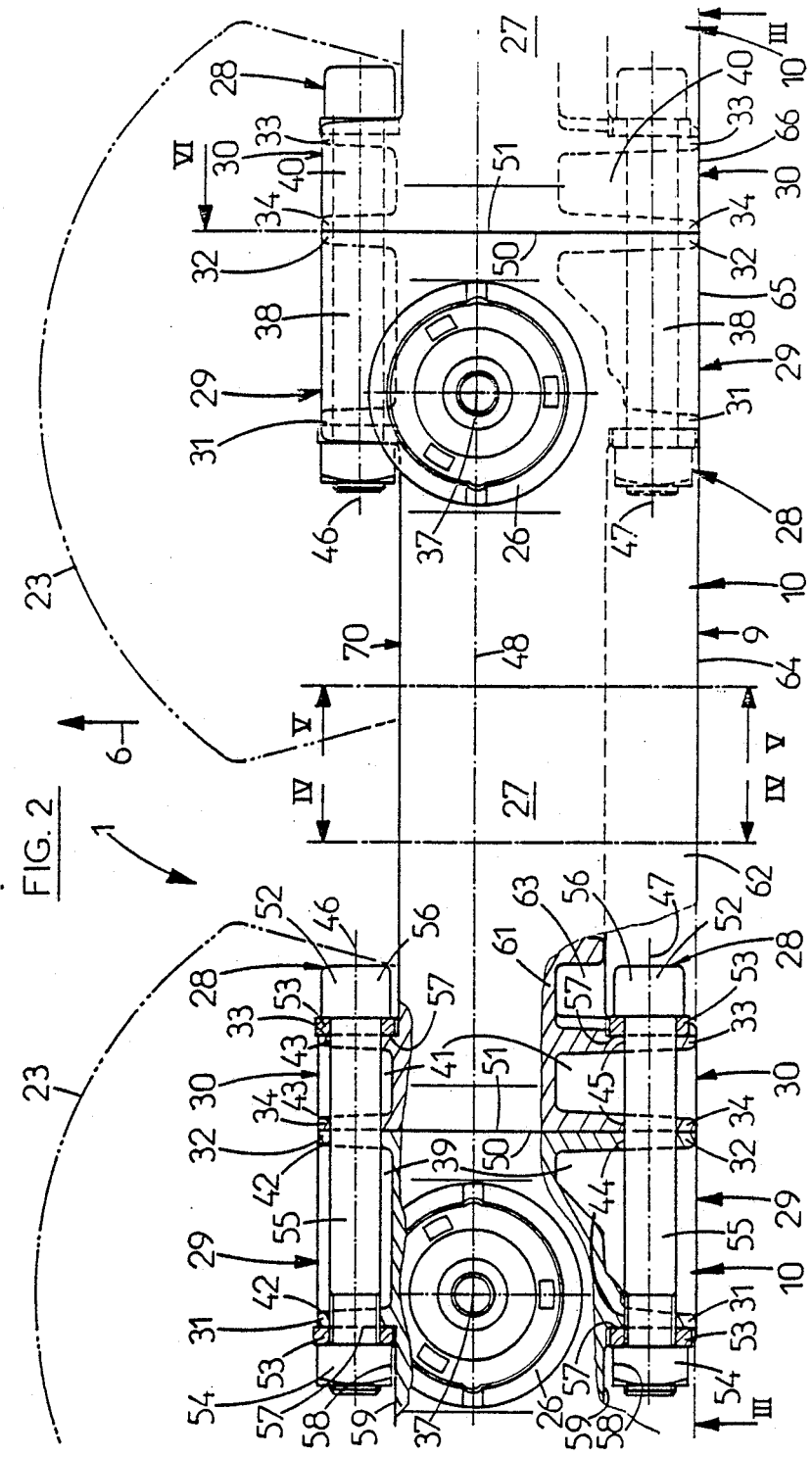
FIG. 2 is a top view on an enlarged scale and partially sectioned along plane II in FIG. 3 of the cutting bar of FIG. 1 without cutting elements.
Figure 3:
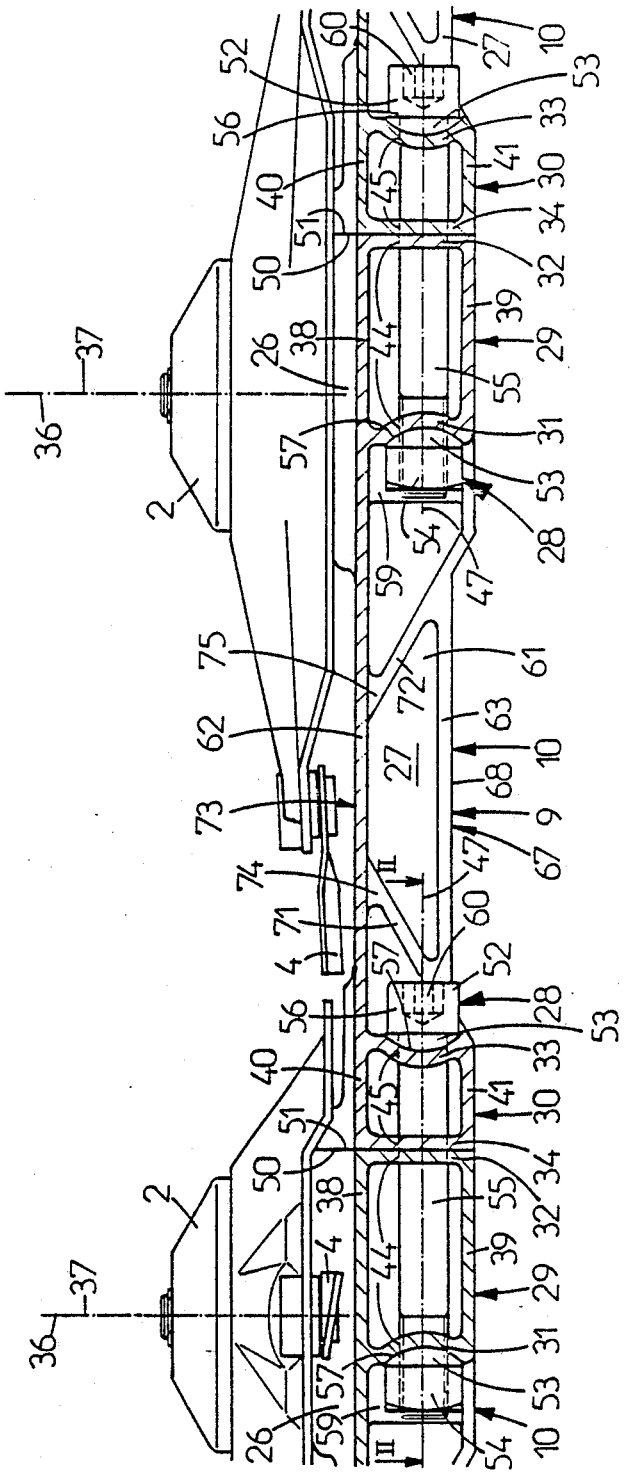
FIG. 3 is a view in section along plane III in FIG. 2 of the cutting bar of FIG. 1.

It can also be seen in FIGS. 2 and 3 that the flanges 29, 30 touch each other at their wings 32, 34 and that the wings 31, 33 serve as support surfaces for the assembly elements 28. In this way, the assembly elements 28 can have a sufficient length to allow them to withstand well the stresses to which they are subjected. Similarly, contact surfaces 50, 51 between the two wings 32, 34 have a sufficient surface so as not to be subjected to peening (see FIG. 6), and the flanges 29, 30 can be cast in a sound way.

The wings 31, 32 of the flanges 29 are connected together by two connecting wings 38, 39, and the wings 33, 34 of the flanges 30 are connected together by two connecting wings 40, 41. The connecting wings 38, 39, 40, 41 are directed crosswise in relation to the working direction 6 and extend at least approximately horizontally. Moreover, they are connected to the body of the module 10. The connecting wings 38, 40 extend to the high part of the wings 31, 32, 33, 34, while the connecting wings 39, 41 extend to the bottom part of the wings 31, 32, 33, 34. The connecting wings 38, 39, 40, 41 serve to limit very considerably the bending of the wings 31, 32, 33, 34 of the flanges 29, 30.

With this arrangement, the flanges 29, 30 thus have, at the front and back, seen in the working direction 6, the shape of a pipe with an approximately quadrilateral section.

The wings 31, 32, 33, 34 of the flanges 29, 30 have at the front a hole 42, 43 and at the back a hole 44, 45. The holes 42, 44, 43, 45 go all the way through the wings 31, 32, 33, 34. As can be seen in FIGS. 2 and 3, the holes 42, 43 and 44, 45 are coaxial. Moreover, as can be seen in FIG. 6, the common axis 46 of the front holes 42, 43 and the common axis 47 of the back holes 44, 45 extend in the vicinity of the at least approximately horizontal median plane 49 of the contact surfaces 50, 51 of the wings 32, 34 of the flanges 29, 30.

The holes 42, 44, 43, 45 made in the wings 31, 32, 33, 34 of the flanges 29, 30 are passed through by the assembly elements 28, which therefore extend, seen in the working direction 6, between the two connecting wings 38, 39, 40, 41 which connect the wings 31, 32, 33, 34. Each assembly element 28 consists of a tie rod 52 comprising a rod 55 and a head 56, two washers 53, and a nut 54 screwed onto the rod 55 of the tie rod 52. The washers 53 are inserted, on the one hand, between the head 56 of the tie rod 52 and the wing 33 of the flange 30 and, on the other hand, between the nut 54 and the wing 31 of the flange 29. The washers 53 are advantageously made of steel, preferably tempered, so that the contact surface between the head 56 of the tie rod 52 and the washer 53, like the contact surface between the nut 54 and the washer 53, can correctly withstand the pressure created by locking of the nut 54 on the tie rod 52 and by the stresses absorbed by the tie rod 52 and the nut 54 during working or transporting.

Since the wings 31, 33 of the flanges 29, 30 are preferably made of cast iron, according to the invention the surface of a support face 57 of the wings 31, 33 intended to come in contact with the washers 53 is increased. To do this, the support face 57 of the wings 31, 33 has the shape of a cylindrical surface portion having an axis 35, just like the face of the washer 53 intended to come in contact with the support face 57 of the wings 31, 33, which also has the shape of a cylindrical surface portion of a dimension at least approximately identical with that of the support face 57.

As can be seen in FIG. 3, the curvature of the support face 57 of the wings 31, 33 in the shape of a cylindrical surface portion is directed toward the wings 32, 34 serving as contact faces between two neighboring modules 10. This allows the achievement of a very careful machining of the support face 57 of the wings 31, 33 so that the contact between the wings 31, 33 and the washer 53 will be optimal. Thus, a good strength of the housing 9, after assembly of the modules 10, is assured. Advantageously, the axis 35 of the cylindrical surface portion which forms the support face 57 of the wings 31, 33 of the flanges 29, 30 extends at least approximately in the working direction 6.

Since the increase of the surface of the support face 57 of the wings 31, 33 is achieved as described above, it is possible to make the housing 9 very compact.

Figure 5:
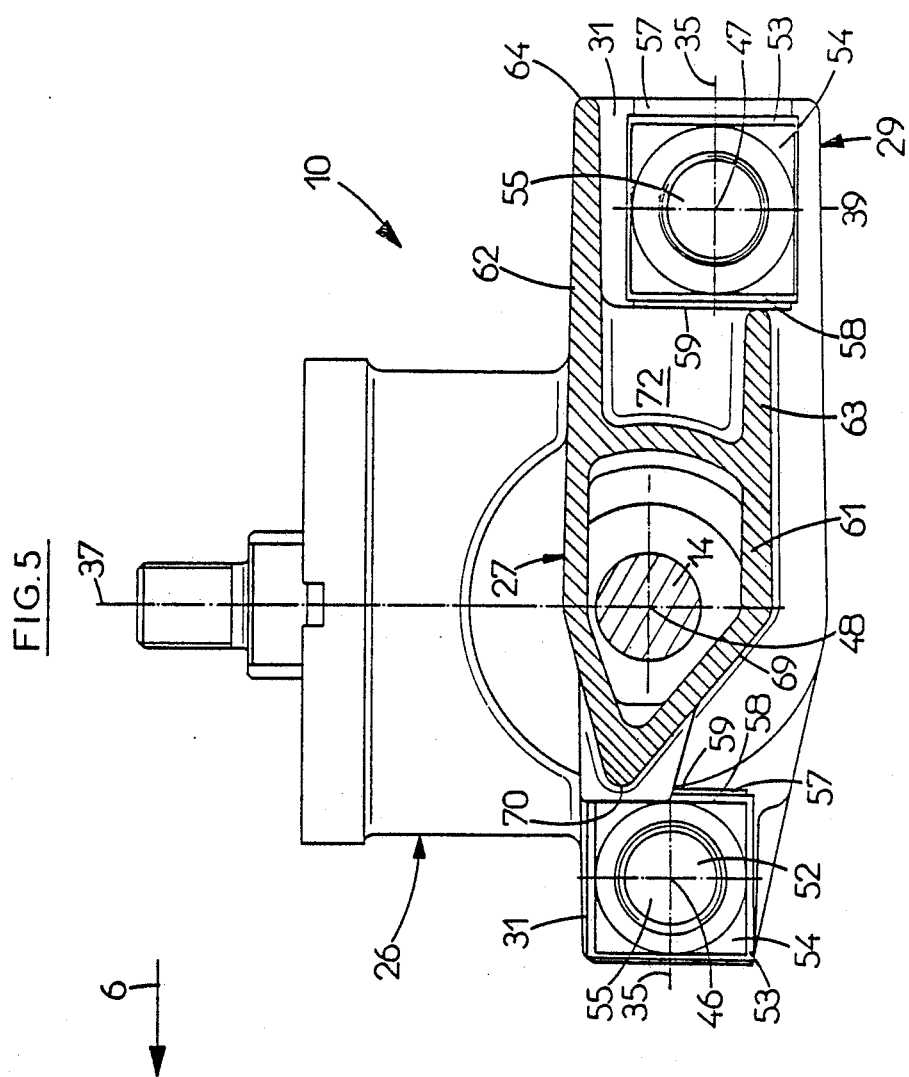
FIG. 5 is a view in section along plane V in FIG. 2 of the cutting bar of FIG. 1.

In FIGS. 2 and 5 it can be seen that a side 58 of the nut 54 extends in the vicinity of a part 59 of the module 10. This makes it possible automatically to block the rotation of the nut 54 during screwing and unscrewing, because the side 58 of the nut 54 strikes the part 59 of the module 10. In this way, it is not necessary to use a tool to achieve this blocking. For this blocking to be achieved effectively, while allowing a certain play between the side 58 of the nut 54 and the part 59 of the module 10 compatible with general foundry tolerances, the nut 54 advantageously has a square shape. The side 58 of the nut 54 thus has a relatively long length, so that blocking is always effectively achieved.

Figure 4:
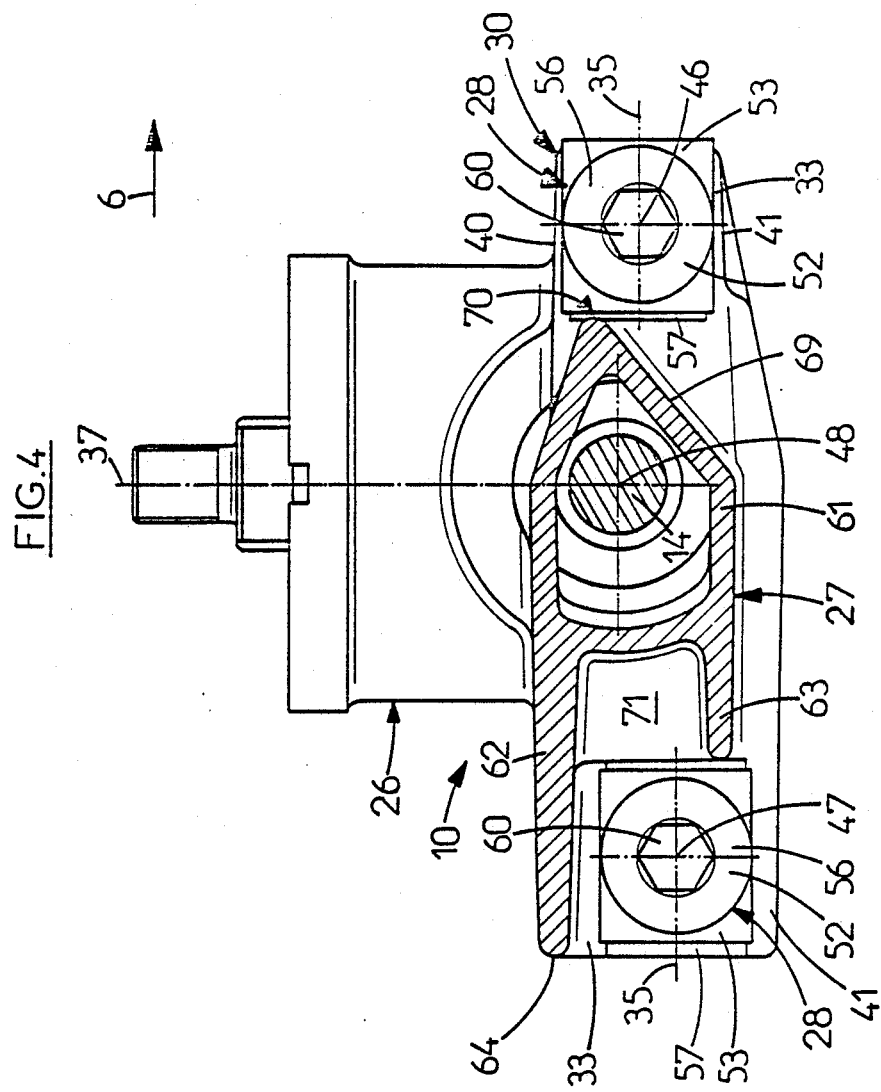
FIG. 4 is a view in section along plane IV in FIG. 2 of the cutting bar of FIG. 1.

Moreover, in FIGS. 3 and 4 it can be seen that the head 56 of each tie rod 52 is advantageously round and comprises a hexagonal central recess 60. The advantage of this arrangement will come be discussed later.

As mentioned above, each module 10 is made up of a case 26 in which the corresponding cutting element 2, 3 is guided in rotation and of a brace 27 which extends between that case 26 and the case 26 of an adjacent module 10.

In FIGS. 4, 5, and 6, it is seen that the brace 27 is formed on a part at least of its length by a tubular section 61 which surrounds the transmission means 14 housed in the housing 9. At the back, the tubular section 61 is provided with two stiffening wings 62, 63. One 62 of the stiffening wings is connected to the upper part of the tubular section 61, and the other one 63 of the stiffening wings is connected to the lower part of the tubular section 61.

The upper stiffening wing 62 is wider than the lower stiffening wing 63. This particularly makes it possible to integrate well the assembly elements 28 located at the back in the space of the housing 9 without the width and thickness of the housing 9 becoming too great. This is very important for obtaining a good crop cutting quality. It should be noted that the back assembly elements 28, 52, 53, 54 extend, seen from above, approximately entirely under the upper connecting wings 38, 40 and under the upper stiffening wings 62. Advantageously, the width of the upper stiffening wing 62 is approximately double the width of the lower stiffening wing 63. Moreover, the two stiffening wings 62, 63 extend crosswise to the working direction 6 and at least approximately horizontally. Moreover, it can also be seen in FIGS. 2, 3, 4 and 5 that the upper stiffening wing 62 is, at least in part, the continuity of the back part of the upper connecting wings 38, 40 of the flanges 29, 30. FIG. 2 shows in particular that the back edge 64 of the upper stiffening wing 62 is approximately colinear with the back edge 65, 66 of the upper connecting wings 38, 40 of the flanges 29, 30.

The lower stiffening wing 63 is also in part at least (particularly at its ends) in continuity with the back part of the lower connecting wings 39, 41 of the flanges 29, 30. In its median part 67, the lower stiffening wing 63 comprises a set-back 68 in the direction of the upper stiffening wing 62. The space between the lower stiffening wing 63 and the ground on which the housing 9 slides during working therefore is greater, so that the ground which slides along lower face 69 of the front edge 70 of the brace 27 can easily pass under the lower stiffening wing 63. Thus, packings are avoided.

To increase the strength of the module 10, it can also be seen that the upper and lower stiffening wings 62, 63 are connected together by ribs 71, 72 directed crosswise to the longitudinal axis 48 of the housing 9. As can be seen in FIG. 3, the ribs 71, 72 are connected at least approximately to the ends of the lower stiffening wing 63, extend obliquely upward, and converge toward the median part 73 of the upper stiffening wing 62. The connecting points 74, 75 o the ribs 71, 72 to the upper stiffening wing 62 are arranged at least approximately at the first third and the second third of the length of the upper stiffening wing 62. Moreover, it is also seen that the width of the ribs 71, 72 is approximately equal to the width of the lower stiffening wing 63.

With this arrangement, the brace 27 of each module 10 is very strong, since the ribs 71, 72 form a sort of triangulation. Moreover, it is also to be noted that, the making of the ribs 71, 72 is relatively easy at the foundry.

As mentioned above, the tie rods 52 have round heads 56 which are provided with hexagonal central recesses 60. This makes it possible to make the housing 9 compact without thereby acting to the detriment of the ease in mounting. It is very easy to reach the head 56 of each tie rod 52 with a tool such as a pneumatic screwdriver, for example.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A mower comprising:
 (a) a plurality of rotary cutting elements each one of which is provided with at least one cutting tool;
 (b) at least one of said plurality of rotary cutting elements being driven by transmission means housed in a housing located under said plurality of rotary cutting elements;
 (c) said housing comprising modules in which said rotary cutting elements are guided in rotation;
 (d) said modules comprising each a body and two flanges, a first flange extending at a first end portion of the corresponding module and a second flange extending at a second end portion of the corresponding module, said flanges permit to connect said modules to one another by means of assembly elements passing through said flanges;
(e) said flanges being each at least partially formed by at least two wings spaced from one another in a longitudinal direction of said housing and directed crosswise to a longitudinal axis of said housing; and
(f) said wings being connected together by at least one connecting wing directed crosswise in relation to a working direction and connected to the body of the associated module.

2. A mower according to claim 1 wherein said wings extend at least approximately in the working direction.

3. A mower according to claim 1 wherein said wings extend at least approximately vertically.

4. A mower according to claim 1 wherein said at least one connecting wing extends at least approximately horizontally.

5. A mower according to claim 1 wherein:
(a) said wings are connected by two connecting wings, of which one extends to the upper part of said wings and the other one extends to the lower part of said wings, and
(b) said assembly elements extend, seen in the working direction, between said two connecting wings.

6. A mower according to claim 5 wherein said flanges have at the front and back, seen in the working direction, a pipe shape of at least approximately quadrilateral section.

7. A mower according to claim 1 wherein:
(a) the wings of each flange are provided at the front with a front hole, said front holes having a first common axis;
(b) the wings of each flange are provided at the back with a back hole, said back holes having a second common axis;
(c) said front holes and said back holes serve for the passage of said assembly elements; and
(d) said first common axis and said second common axis extend in the vicinity of the approximately horizontal median plane of the contact faces of said flanges.

8. A mower according to claim 1 wherein each module comprises:
(a) a case in which a cutting element is guided in rotation and
(b) a brace extending between that case and the case of a neighboring module, and
(c) wherein the one of said flanges located on the side of said case is wider than the one of said flanges located at the end of said brace away from said case.

9. A mower according to claim 1 wherein each module comprises:
(a) a case in which a cutting element is guided in rotation and
(b) a brace extending between that case and the case of a neighboring module, and
(c) wherein the one of said flanges located on the side of said case comprises:
(i) a wing which extends on one side of a vertical plane directed in the working direction and going through the axis of rotation of the one of said cutting element guided in rotation in said case and
(ii) a wing which extends on the other side of said plane.

10. A mower according to claim 1 wherein each one of said assembly elements is made up of a tie rod comprising a rod and a head, two washers, and a nut.

11. A mower according to claim 10 wherein one of said at least two wings of each flange serves as support for a respective one of said two washers and have a support face in the shape of a cylindrical surface portion, and the face of said respective one washer which come in contact with said support face of said wing also has the shape of a cylindrical surface portion of a dimension at least approximately identical with that of said support face.

12. A mower according to claim 11 wherein the curvature of said support face of one of said at least two wings is directed toward an other of said at least two wings which serves as a contact face between two adjacent modules.

13. A mower according to claim 11 wherein the axis of the cylindrical surface portion forming said suport face is directed at least approximately in the working direction.

14. A mower according to claim 10 wherein each module comprises at least one part against which at least one side of said nut strikes to block the rotation of said nut during screwing and unscrewing of said tie rod.

15. A mower according to claim 14 wherein said nut has a square shape.

16. A mower according to claim 10 wherein said head of said tie rod is round and has a hexagonal central recess therein.

17. A mower comprising:
(a) a plurality of rotary cutting elements each one of which is provided with at least one cutting tool;
(b) at least one of said plurality of rotary cutting elements being driven by transmission means housed in a housing located under said plurality of rotary cutting elements;
(c) said housing comprising modules in which said rotary cutting elements are guided in rotation;
(d) said modules comprising each:
(i) a case in which a cutting element is guided in rotation
(ii) a brace integral with said case and extending between said case and the case of a neighboring module
(iii) two flanges, a first flange extending on the side of said case and a second flange extending at the end of said brace away from said case and
(iv) said flanges having a front portion and a rear portion
(e) said flanges permit to connect said modules to one another by means of two tie rods passing through the first flange of a module and the Second flange of a neighboring module, a first tie rod extending at the front portion of said flanges and a second tie rod extending at the rear portion of said flanges;
(f) said flanges having each a support face on which the corresponding tie rods rest, and a contact face, the contact face of the first flange of a module being adapted to contact the contact face of the second flange of the neighboring module; and
(g) the support face of the first flange of a module extends on one side of a vertical plane directed in the working direction and going through the axis of rotation of the one of said cutting elements guided in rotation in the case of said module, and the contact face of said first flange extends on the other side of said plane.

18. A mower according to claim 17 wherein said first flange is wider than said second flange.

19. A mower according to claim 17 wherein each one of said tie rods comprising a rod and a head, two washers, and a nut.

20. A mower according to claim 19 wherein said support faces serve as support for a respective one of said two washers and have the shape of a cylindrical surface portion, and the face of said respective one washer which come in contact with said respective support face also has the shape of a cylindrical surface portion of a dimension at least approximately identical with that of said respective support face.

21. A mower according to claim 20 wherein the curvature of said support faces is directed toward said respective contact faces.

22. A mower according to claim 20 wherein the axis of the cylindrical surface portion forming said support face is directed at least approximately in the working direction.

23. A mower according to claim 19 wherein each module comprises at least one part against which at least one side of said nut strikes to block the rotation of said nut during screwing and unscrewing of said tie rod.

24. A mower according to claim 23 wherein said nut has a square shape.

25. A mower according to claim 19 wherein said head of said tie rod is round and has a hexagonal central recess therein.

* * * * *

UNITED STATES PATENT AND TRADEMARK OFFICE
CERTIFICATE OF CORRECTION

PATENT NO.  : 4,811,553
DATED       : Mar. 14, 1989
INVENTOR(S) : Rino Ermacora, et al It is certified that error appears in the above-identified patent and that said Letters Patent is hereby corrected as shown below:

Title Page:

The Foreign Application Priority Data is incorrectly recorded,
 "Feb. 27, 1985 [FR]    France..........86 02899" should be:
--Feb. 27, 1986 [FR]    France..........86 02899--

The 6th U.S. Patent Document is incorrectly recorded,
 "∝,720,964 1/1988    Ermacora, et al.....56/13.6" should be:
--4,720,964 1/1988    Ermacora, et al.....56/13.6--

Signed and Sealed this

Second Day of October, 1990

Attest:

HARRY F. MANBECK, JR.

*Attesting Officer*          *Commissioner of Patents and Trademarks*